3,706,698
PROCESS FOR THE DYEING OF SYNTHETIC POLYAMIDES IN BULK
Arthur Buehler, Rheinfelden, and Felix Steinlin, Dornach, Solothurn, Switzerland, assignors to Ciba-Geigy AG, Basel, Switzerland
No Drawing. Filed Mar. 23, 1970, Ser. No. 22,040
Claims priority, application Switzerland, Apr. 29, 1969, 6,560/69
Int. Cl. C08g 53/04
U.S. Cl. 260—37 NP                      2 Claims

ABSTRACT OF THE DISCLOSURE

The invention relates to a process for dyeing synthetic linear polyamides in bulk, wherein a 1:1-chromium complex compound of a monoazo dyestuff that contains at least one sulphonic acid group or a salt thereof is used.

---

The present invention provides a process for bulk dyeing synthetic linear polyamides, for example polyhexamethylene adipamide, polycaprolactam and polymers of aminoundecane-carboxylic acid.

It is known that synthetic linear polyamides can be dyed in the mass by incorporating a dyestuff which is sufficiently stable at any stage in the process of their manufacture before the final spinning or the working up into solid articles. In view of the strong reducing action of melts of synthetic linear polyamides only a few organic dyestuffs are suitable for colouring them in the mass, for example phthalocyanine pigments or 1:2-metal complexes of monoazo dyestuffs that are free from sulphonic acid groups.

The present invention is based on the observation that the 1:1-chromium complexes of monoazo dyestuffs containing one or two sulphonic acid groups and, if desired, further substituents that do not impart solubility in water can be used for spin-dyeing synthetic polyamides with excellent results.

In the process according to this invention, dyestuffs, for example the chromium complexes of monoazo dyestuffs may be used that contain a hydroxyl group in each of the two positions vicinal to the azo bridge, or a carboxyl group and a hydroxyl group, or a hydroxyl group and a primary or secondary amino group; their salts with organic bases with or without dyestuff characteristics, for example rhodamine, may also be used. Such metal complexes are soluble in water, and when the complex has an acidic nature, it may be used either in the form of a salt, for example a sodium, potassium or ammonium salt, or in the form of the free acid. However, it is advantageous for the complexes to contain groups that do not impart solubility in water in positions other than the ortho-positions to the azo bridge. The monoazo dyestuffs must contain as substituents one or two sulphonic acid groups and, if desired, a further substituent that does not impart solubility in water which is bound to an aromatic nucleus of the dyestuff molecule, particularly aliphatic groups, for example methyl, ethyl or isopropyl, and also halogen atoms (e.g. chlorine), or a $CH_3$—$SO_2$— group or nitro or acylamino groups.

The dyestuffs preferably belong to the pyrazolone or naphthol series.

A large number of the chromium complexes to be used is already known, for example from French Pats. 1,083,-982, 570,995, 981,117, 834,236, 756,136, 758,263, 908,655 and 707,441.

The said dyestuff chromium complexes can be incorporated with the synthetic linear polyamide by any one of the methods known for bulk-dyeing, for example by incorporation with the monomers or prepolymers during polymerisation or by pressing them into the melt during spinning. It is more advantageous to use the method according to which the dyestuff chromium complexes are applied to chips of the synthetic linear polyamide by tumbling, whereupon the dyed chips are melted and spun in filament form or converted into solid articles. If desired, the tumbling operation can be carried out with a dispersion of the dyestuff in a volatile solvent, for example water or alcohol, or in a stable dispersion prepared by grinding the dyestuff with water and a finely dispersed synthetic linear polyamide.

According to an advantageous embodiment of the present invention chips of synthetic linear polyamide may be dyed in a dyebath consisting of an aqueous solution or dispersion of at least one of the afore-mentioned 1:1-chromium complexes which, if desired, has been stabilised with a dispersant. The rate of absorption of the dyestuffs may be increased by adding salts to the dyebath, for example ammonium or sodium acetate or primary sodium phosphate.

An excellent exhaustion of the dyebath is obtained by dyeing under superatmospheric pressure at about 130° C.; this process is of special value when applied to chips of a synthetic linear polyamide into which a pigment has been incorporated during manufacture by polymerisation. In this manner the ground colour can be modified so that a variety of shades, including "fashion colours" can be obtained.

After having been dyed the chips are melted and spun in the form of fibres or filaments. The dyed chips may be used not only for the manufacture of textile fibres but also for colouring injection mouldings (zipp fasteners, telephone receivers and the like).

The dyeings produced by the present process possess excellent fastness properties, particularly in respect of washing, rubbing, dry-cleaning and light.

Of special value for use in the present process are the 1:1-chromium complexes of dyestuffs of the formula

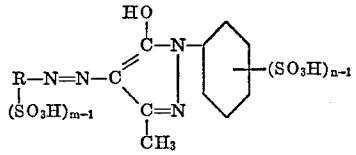

in which R represents either a naphthyl residue containing a hydroxyl group in vicinal position to the azo bridge or an ortho-carboxy or ortho-hydroxybenzene residue which may contain a chlorine atom or a further sulphonic acid group, and $m$ and $n$ each=1 or 2.

Another valuable group of chromium complexes suitable for advantageous use in the process of this invention comprises the 1:1-chromium complex compounds of ortho-hydroxyphenylazo-β-naphthol sulphonic acids.

Since the complexes used in the present process are soluble in molten polyamides, their dispersion throughout the whole mass presents no problem and during the subsequent spinning no difficulties arise in connection with clogged spinneret plates. Notwithstanding their solubility the dyestuffs do not migrate to the surface during the pleating of textile materials so that the colours in the pleated textile materials display excellent fastness to rubbing.

In comparison with the dyeing of finished polyamide fibres spin-dyeing offers certain advantages: it is less costly, requires smaller apparatus because extremely short dyebaths can be used and in many cases surprisingly provides a method for covering stripy dyeings. When compared with the known process in which organic or inorganic pigments are used the present process also provides some unexpected advantages, for example absence of fibril breakages, immediate assurance of homogeneity (without protracted kneading or grinding of the polyamide with the pigment), omission of any purification of the dyestuffs and the like.

The following examples illustrate the invention, the parts and percentages being by weight, unless otherwise indicated.

EXAMPLE 1

2 parts of the 1:1-chromium complex of the dyestuff of the formula

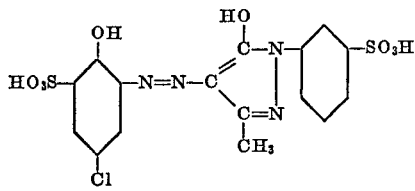

and about 10 parts of water are stirred with 98 parts of polyhexamethylene adipamide in chip form until an even coating of the coloured complex has formed on the surface of the chips. The chips are dried, melted and then spun in a conventional apparatus. The resulting red filament has excellent fastness to washing, rubbing, drycleaning and light.

EXAMPLE 2

1 part of the 1:1-chromium complex of the dyestuff of the formula

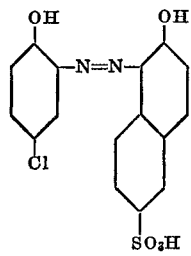

is mixed with 4 parts of water to form an aqueous paste which is mixed with 1 part of polyhexamethylene adipamide in the form of a finely disperse aqueous paste. The mixture is ground with 98 parts of polyhexamethylene adipamide in chip form in a drum drier until the water has evaporated. The coated chips are melted and spun in a conventional apparatus to provide deep violet filaments having excellent properties of fastness to washing, rubbing, dry-cleaning and light.

EXAMPLE 3

2 parts of the 1:1-chromium complex of the dyestuff of the formula

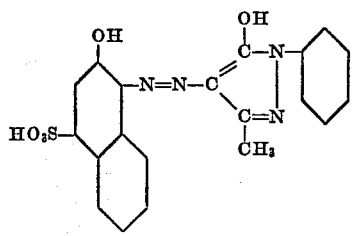

are dissolved in 250 parts of water; 100 parts of polyamide chips are immersed in this dyebath, and the whole is raised to the boil. After 30 minutes 1 part of glacial acetic acid is advantageously added and dyeing is continued for 3 hours. Instead of glacial acetic acid other acids, for example formic acid, or salts, for example ammonium or sodium acetate or sodium phosphate, may be added to increase the rate of absorption and improve the degree of exhaustion of the dyebath.

The dyed chips are then washed with water and dried as usual under vacuum whereupon they can be spun forthwith to form pink-coloured filaments.

When the 1:1-chromium complexes of the dyestuffs listed in column I of the following table are used in the process described above, the polyamide fibres spin-dyed from the melt have the shades indicated in column II.

| I | II | |
|---|---|---|
| 9 | 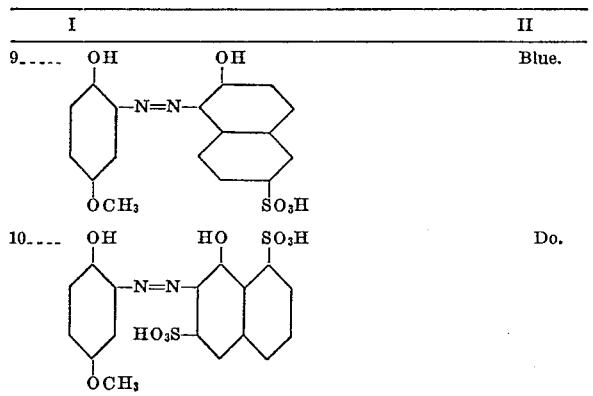 | Blue. |
| 10 | | Do. |

We claim:

1. In a process for bulk dyeing synthetic linear polyamides wherein the strong reducing action of the molten polyamide has a deleterious effect on the dyestuff, the improvement which comprises coating chips of the polyamide in a dyebath consisting of an aqueous solution with 1:1 chromium complex of a member of the benzene-azo-naphthalene series containing one sulfonic acid group or salt and, in each of the two positions vicinal to the azo bridge, a hydroxyl group or one hydroxyl group and one carboxyl group, said azo compound optionally being substituted on an aromatic nucleus by methyl, ethyl, isopropyl, methoxy, chloro, nitro, methylamidosulfonyl or methylsulfonyl, drying the chips and thereafter melting the coated chips to form fibers or solid articles.

2. An improved process according to claim 1 in which dyestuff is the 1:1 chromium complex of the dyestuff having the formula

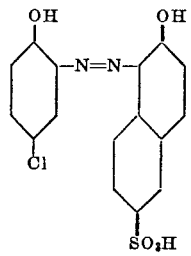

References Cited

UNITED STATES PATENTS

| 2,884,410 | 4/1959 | Randall | 260—37 NP |
| 3,459,727 | 8/1969 | Steiner et al. | 260—37 NP |

FOREIGN PATENTS

| 908,655 | 4/1946 | France | 260—37 |
| 886,932 | 1/1962 | Great Britain | 260—37 NP |
| 834,236 | 11/1938 | France | 260—37 R |
| 1,083,982 | 1/1955 | France | 260—37 R |
| 1,021,938 | 3/1966 | Great Britain | 8—162 S |

ALLAN LIEBERMAN, Primary Examiner

U.S. Cl. X.R.

8—42 B, 162 S; 260—37 N